United States Patent [19]

Teer et al.

[11] 4,022,986
[45] May 10, 1977

[54] PLAYBACK UNIT FOR A LONG-PLAYING RECORD OF A TIME DIVISION MULTIPLEXED AUDIO SIGNAL

[75] Inventors: Kees Teer; Peter Johannes Michiel Janssen; Laurentius Antonius Peter Maria de Bot, all of Eindhoven, Netherlands

[73] Assignee: U.S. Philips Corporation, New York, N.Y.

[22] Filed: Apr. 29, 1974

[21] Appl. No.: 464,787

[30] Foreign Application Priority Data

Feb. 15, 1974 Netherlands .............. 7402077

[52] U.S. Cl. .............. 179/100.3 B; 360/23; 179/100.3 V; 179/1 SM; 360/18; 360/32; 179/100.4 ST; 179/100.1 TD
[51] Int. Cl.² .............. G11B 7/00; G11B 27/30
[58] Field of Search .............. 360/22, 23, 37, 18, 360/32; 178/6.7 A, 6.6 R, 6.6 DD; 179/100.3 V, 100.3 T, 100.3 B, 1 SA, 100.4 ST, 100.1 TD, 1 GQ, 1 SM

[56] References Cited

UNITED STATES PATENTS

| | | | |
|---|---|---|---|
| 3,601,536 | 8/1971 | Calfee | 178/66 DD |
| 3,701,846 | 10/1972 | Zenzefilis | 178/6.7 A |
| 3,743,793 | 7/1973 | Emerson | 360/12 |
| 3,745,264 | 7/1973 | Emerson | 179/1 SA |
| 3,748,381 | 7/1973 | Strobele | 360/11 |
| 3,769,468 | 10/1973 | Shutterly | 179/100.3 B |

Primary Examiner—Bernard Konick
Assistant Examiner—Alan Faber
Attorney, Agent, or Firm—Frank R. Trifari; Simon L. Cohen

[57] ABSTRACT

A system comprising a playback unit and an associated long-playing record on which sound information is recorded in a time division multiplex code on several tracks. Upon reproduction the same track is scanned $n$ times with the aid of a beam of light before this beam of light is directed to the next track. With the aid of a sampling gate the pulses comprising the sound information in time division multiplex code and associated with a first sound channel are sampled with the aid of said sampling gate while during a second revolution pulses from a second sound channel etc. are sampled.

In order to operate this sampling gate in synchronism with the scanning of said pulses the playback unit comprises first synchronizing means responding to pulses also comprising the sound information. Furthermore, at the commencement of each track, starting pulses are provided to which second synchronizing means respond. The output signals thereof control the first synchronizing means and a pivoting mirror reflecting the beam of light which after the record has made $n$ revolutions with one and the same track being scanned is pivoted so that the beam of light is directed to the next track to be scanned. In another embodiment the pulses comprising the sound information are distributed in $m$ groups of pulses 1 to $n$ over a track and each group is preceded by a group pulse to which third synchronizing means respond. The output signals of these third synchronizing means control the first synchronizing means.

9 Claims, 10 Drawing Figures

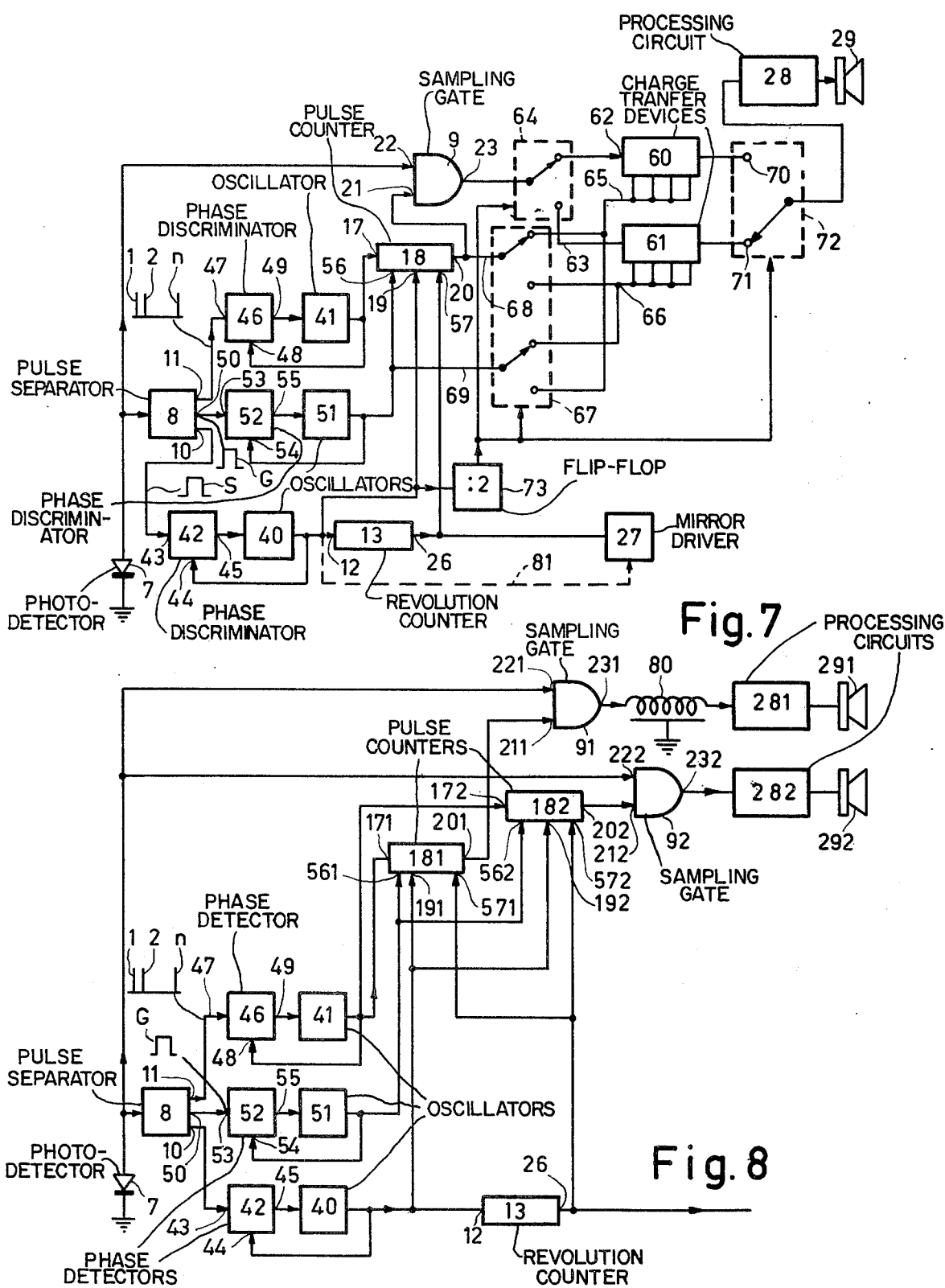

PLAYBACK UNIT FOR A LONG-PLAYING RECORD OF A TIME DIVISION MULTIPLEXED AUDIO SIGNAL

The invention relates to a system including a playback unit and an associated long-playing record on which sound information is recorded in a time-division multiplex code and this is in $r$ information tracks provided as concentric circles or as semi-concentric circles (for example, spiral-shaped) on the record, which unit includes follower means for causing a pick-up device to follow an information track, a detector detecting pulses derived from the record through the pick-up device, said pulses comprising the sound information in said time division multiplex code, said detector applying said pulses to a sampling gate which is controlled by synchronizing means and passes pulses that comprise information for a single sound channel.

Such a long-playing record, hereinafter referred to as audio long-playing record (and therefore called the ALP mode), is known from U.S. Pat. application Ser. No. 76,572, filed Sept. 29, 1970, to William W. Ramage, now abandoned, corresponding to German Offenlegungsschrift No. 2,147,512. This printed German Offenlegunsschrift No. 2,147,512 application states, however, that in addition to the audio track (AT) comprising pulses for sound information a track is present for synchronizaton (Code Track = CT).

In the present long-playing record as described, for example, in Philips Technical Review, Volume 33, 1973, No. 7, pages 178 to 193 the tracks are scanned by means of a pick-up device formed as a light beam (see, for example, FIG. 2 on page 180 of said Philips Technical Review) which must be maintained exactly on the track to be scanned with the aid of a control system (see also FIGS. 6 and 7 on page 188 and 189 of said Philips Technical Review).

It will be evident that doubling of such a scanning system is expensive and is therefore unwanted.

In addition the following problem occurs. The code track CT is a single track which will supply pulses of a given frequency upon scanning at a given rotational speed of the record. The audio tracks AT are, however, distributed over the entire record and will decrease in diameter as the scanning light beam moves towards the center (when scanning of the audio tracks is effected from the edge of the record to the center). Therefore it is to be ensured during recording that the distribution of the pulses over the audio tracks AT is adapted due to the varying diameter to the distribution of the synchronizing pulses over the code track CT. It will be evident that such an adaptation varying as a function of the diameter involves difficulties during recording, especially when it is considered that this adaptation must be maintained with sufficient accuracy during bulk manufacture of these records.

The invention therefore has for its object to provide a long-playing record with associated playback unit in which the favorable possibility of an uninterrupted audio recording is maintained over a comparatively long period (consider long concert performances, operas and the like) and to obviate the problem of adaptation while the separate code track on the record is omitted and to incorporate the entire synchronization in the tracks carrying sound information. In order to achieve this the system including the playback unit and the associated long-playing record for sound recording is characterized in that said synchronizing means, comprises a first synchronizing means, which responds to the pulses obtained during playback from the grooves which are distributed in $m$ groups of $m$ grooves per track and which at least for the greater part of the $r$ tracks also comprise the sound information, and a second synchronizing means responding to starting pulses (S) obtained during playback from the starting grooves and provided every time at the commencement of each of the $r$ tracks said starting pulses (S) indirectly controlling through the second synchronizing means, the first synchronizing means for the shift of the passage from one audio channel to the passage of the other audio channel by means of the sampling gate and directly the second synchronizng means, after $n$ revolutions of the record when the same track has been scanned, for the change over of the pick up device to a subsequent track to be scanned.

It is to be noted tht German Offenlegungsschrift No. 2,055,080 states that starting pulses are provided on a long-playing record to be scanned mechanically which pulses are utilized in the playback unit so as to be converted, by means of an adjustable phase shifter or delay circuit, into scanning pulses controlling the sampling gate. It will be evident that such a playback unit cannot satisfactorily operate because the adjusted phase shift or delay time must exactly correspond to a rotational speed of the record which is assumed to be completely constant. In fact, the time elapsing between the occurrence of a starting pulse and the pulses from the groups comprising information of the audio channel to be scanned is dependent on the rotational speed of the record. When this rotational speed varies (which it always does, even if it is very little) the same time varies and no longer corresponds to the phase shift or delay time of the adjustable phase shifter or delay circuit fixed for playing back a given audio channel.

It is therefore strictly necessary to synchronize continuously as is effected in accordance with the insight of the invention and to utilize apart from the starting pulses S, the $n$ pulses of the $m$ groups which also comprise the sound information, simultaneously for synchronization.

It is to be noted that the pulses referred to as starting pulses in German Offenlegungsschrift No. 2,055,080 are referred to as group pulses in the present invention.

Furthermore it is to be noted that German Offenlegungsschrift No. 2,055,080 also refers to starting pulses such as the pulses S in the present invention which occur at the beginning or the end of a track to be scanned. Since in German Offenlegungsschrift No. 2,055,080 a spiral-shaped track is only referred to, such a starting pulse is provided on the record only once and its function is therefore only to indicate the shaft of the scanning moment of the sampling gate from scanning of one audio channel to scanning of the other audio channel.

In the present invention the starting pulses S not only fulfil this function but also the function of switching over scanning from one track after $n$ revolutions of the record to scanning of a subsequent track through a revolution counter to be described hereinafter which is associated with the second synchronizing means. Second synchronizing means are not used according to the invention as described in German Offenlegungsschrift No. 2,055,080 because only one spiral-shaped track is present and not a plurality of tracks as in the long-playing record according to the present invention.

Possible embodiments of a system according to the invention including a playback unit with an associated long-playing record will be described with referenc to accompanying accompaying Figures in which FIG. 1 shows a long-playing record for sound reproduction on which the $r$ tracks are provided in concentrical circles.

FIG. 7 is a further embodiment of playback unit in which tracks as shown in FIG. 6 are provided on the record.

FIG. 8 shows an embodiment of a playback unit for stereophonic reproduction of sound recorded on the $r$ tracks of a long-playing record.

Figure 1:
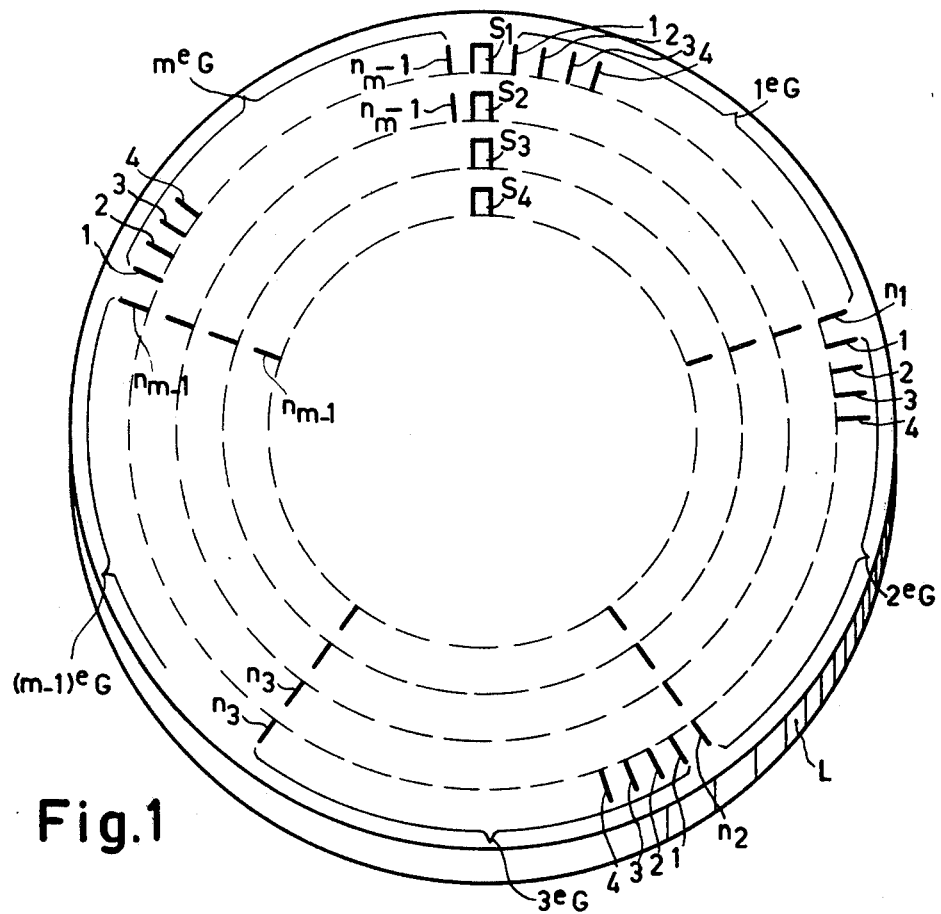
FIG. 1 shows a long-playing record L intended for sound recording and playback, the so-called audio long-play mode (ALP) with tracks provided with pulse series in order to scan various audio channels sequentially. These tracks may be provided as concentrical circles (FIG. 1) but alternatively a so-called continuous spiral-shaped track is possible (FIG. 2).
Figure 2:
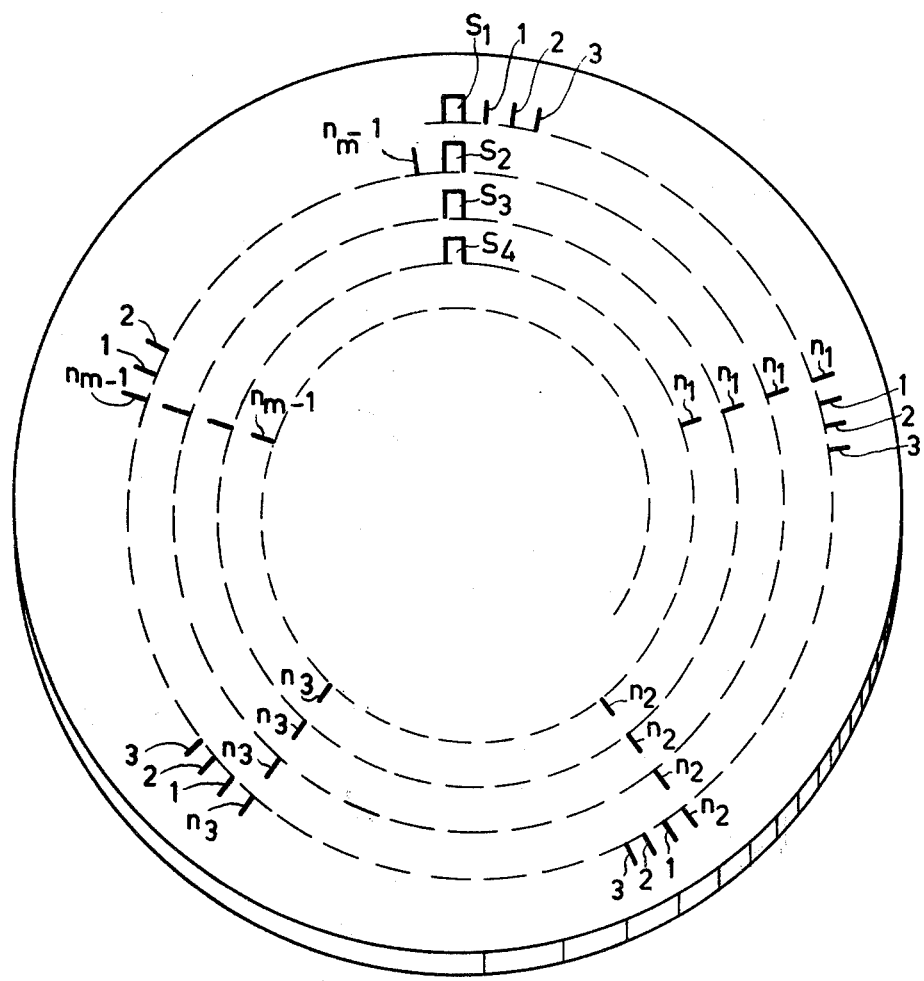
FIG. 2 shows such a long-playing record in which the $r$ tracks are provided in so-called semicentrical circles, i.e. in a continuous spiral-shaped track.

As is shown in FIGS. 1 and 2 each track comprises $m$ groups of pulses in which each group, except for the last, comprises $n$ pulses. First, all pulses 1 of each group of one track are scanned (hereinafter referred to as channel 1), subsequently the pulses 2 of each group of the same track are scanned (channel 2) then the pulses 3 (channel 3), etc. until the $n$ pulses of each group (channel $n$) of still the same track have been scanned. The $m^{th}$ group of pulses has, however, only $n-1$ pulses so that when the $n^{th}$ pulse of the $(m-1)^{th}$ group is scanned a change-over can take place to the pulses 1 of the $m$ groups of the next track.

The mechanism ensuring this will be further described hereinafter.

It is to be noted that for the sake of simplicity the pulses in the tracks shown are denoted as vertical stripes, but it should be noted that actually each pulse is a groove having its longest direction in the direction of the track and having a width in the order of 1 $\mu M$ and a length dependent on the information to be recorded (see the Articles in Philips Technical Review mentioned in the preamble).

In order to enable synchronization in accordance with the principle of the invention so that the audio channels 1 to $n$ of each track can be scanned successively in the correct sequence while it is known when the first pulse of the first audio channel can be expected, a starting or synchronizing pulse S is provided at the commencement of each track (in the case of circular tracks and the case of a spiral-shaped track) (see the pulses $S_1$, $S_2$, $S_3$ etc in FIGS. 1 and 2). This starting pulse S has a duration which is larger than the largest duration of each of the pulses 1, 2, 3 ... $n$ of the $m$ groups of pulses comprising the sound information. This can be realized by providing a groove on the record at the commencement of each track, which groove has a length (in the longitudinal direction of the track) which is larger than the maximum occurring length of grooves yielding upon playback of the record the $m$ groups of pulses 1 to n which are equally distributed over the rest of each track. It is of course alternatively possible to give the pulses S a duration which is shorter than the shortest duration of each of the n pulses of the $m$ groups and it is also alternatively possible to provide the starting pulses S in the form of a given code word on the record. In the latter case this might be referred to as a track identification pulse.

Figure 4:
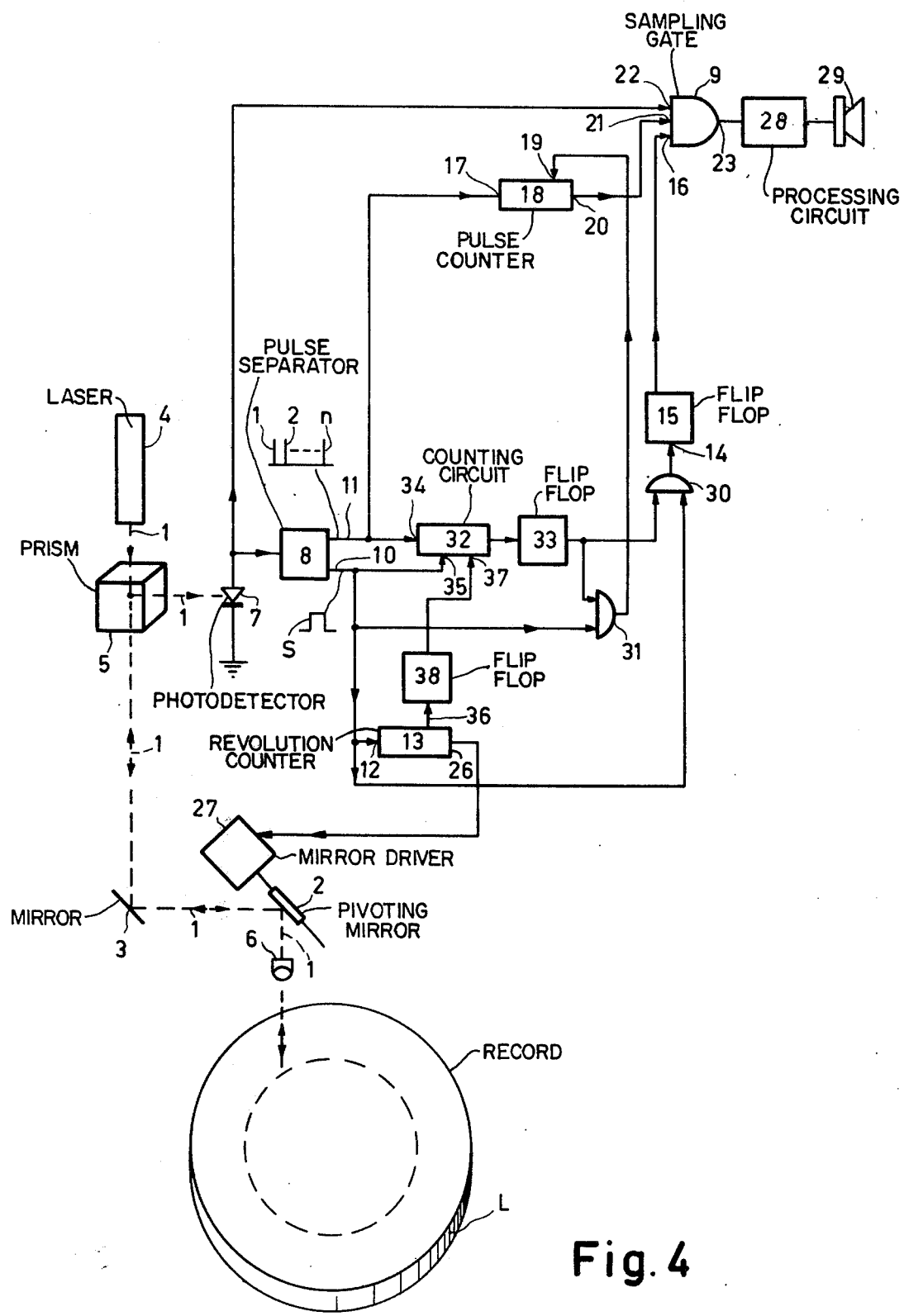
FIG. 4 shows an embodiment of a playback unit for playing-back and reproducing sound information recorded on a long-playing record according to FIGS. 1 and 3.

FIG. 4 shows, as already stated hereinbefore, that the record L is scanned by means of a beam of light 1 operating as a pick-up device, which beam is reflected by a pivoting mirror 2 and a fixed mirror 3. The beam of light 1 comes from a light source 4, for example, a helium neon ($H_e$-$N_e$) laser. A prism 5 is arranged between light source 4 and mirror 3 to separate the incident light (i.e., the light passing from light source 4 to the record L) and the reflected light (i.e., the light reflected by the record L which thus includes the information recorded in the track).

The beam of light 1 is projected onto the record L through an objective lens 6 which is focussed on the record L by means of a loudspeaker system not shown and which lens 6 also passes the reflected light which is shown by the double arrows in the light path of the beam. The emerging light i.e., the light reflected by the record L and separated by the prism 5 is directed onto a photo detector 7 detecting the information in the reflected light and converting it into electrical signals. These signals are applied on the one hand to a pulse separator 8 and for sound processing to a sampling gate 9 which is so referred to because it samples the various associated pulses of a audio channel.

The pulse separator 8 may operate, for example, in accordance with the pulse duration separation principle as is also common practice in television where the longer field synchronizing pulses are separated from the shorter line synchronizing pulses. Consequently the starting pulses S marking the commencement of a track on the record L appear at output 10 of separator 8 and the other pulses 1, 2, 3 ... $n$ comprising the sound information but also being used for synchronizng purposes according to the principle of the invention appear at output 11.

The output is connected to an input 12 of a revolution counter 13 and to an input 14 of a flipflop circuit 15 whose output is connected to a first input terminal 16 of the sampling gate 9.

The output 11 is connected to a first input 17 of a pulse counter 18 a second input 19 of which is coupled to the output 10 of the pulse separator 8.

The output 20 of the pulse counter 18 is connected to a second input terminal 21 of the gate 9. A third input terminal 22 of this gate 9 is directly connected to the photodetector 7.

The gate circuit 9 passes the signal applied to the input 22 to its output 23 both when a pulse occurs at input 16 and when a pulse occurs at input 21. In addition the pulse active at input 21 can only enable the gate (in this connection enabling is understood to mean the preparation of the gate to pass the signal from input 22 to output 23) after a pulse has been active at input 16. In fact channel 1, then channel 2, etc. must be passed on and the first starting pulse S marks the start of channel 1.

The ouput 26 of revolution counter 13 is connected to a driver circuit 27 controlling the pivoting action of mirror 2. Since as already stated hereinbefore the beam of light 1 must start to scan a subsequent track after $n$ revolutions, the output pulse from counter 13 supplying a pulse after $n$ pulses is applied to driver circuit 27 which, initiated by such a pulse, pivots the mirror 2 in such a manner that the beam of light 1 is directed to the next track to be scanned. In fact after $n$ revolutions $n$ pulses S have passed and since change-over from one to the other track takes some time there is a risk that a pulse S of a new track is missed. In fact, the last scanned pulse S of the previous track then acts as the first starting pulse for the subsequent track.

In that case it has been assumed that the concentric circle tracks according to FIG. 1 are concerned. Furthermore it has been assumed that the scanning system is slowly displaced in the radial direction on a carriage, not shown in FIG. 4, and on which the entire optical scanning system is mounted, while a control mechanism ensures that mirror 2 focusses the beam of light 1 on the track to be scanned until the pulse of revolution counter 13 pivots the mirror to the next track onto which it must be directed during $n$ revolutions.

To understand the operation of the playback unit according to FIG. 4 it will be described with reference to FIG. 3 in which a track is shown which in addition to the starting pulse S comprises only 23 pulses carrying sound information. The value of $n$ in this example is 3 so that there are $m = 8$ groups of pulses because $8 \times 3 = 24$, but the last pulse is absent from the last or 8th group. The numbers 3, 6, 9 . . . 21 are marked $n_1, n_2, n_3$. . . $n_7$, respectively, to indicate that these are the last pulses of each group.

As already described hereinbefore a pulse S is produced at output 10 of separator stage 8 which pulse is delayed through a flip-flop circuit 15 in such a manner that a pulse occurs at input 16 at the instant when the beam of light 1 scans a pulse 1 on the relevant track for the first time so that gate 9 is enabled and passes this pulse 1 to its output 23 and then to the processing circuit 28 to which a loudspeaker 29 for sound reproduction is connected.

The pulse 1 also appears at output 11 of the separator stage 8 and is applied to the pulse counter 18. This counter counts to $n$, i.e. in the relevant example to 3 so that after 3 pulses having occurred at the input 17 a pulse is passed on to output 20. In fact counter 18 thus divides by $n$. However, thepulse S derived from separator 8 is applied to input 19. The pulse S at input 19 has for its task to stop the counting mechanism of counter 18 for the period of one of the $n$ pulses. This means that counter 18 actually starts counting when the pulse 2 is scanned and during the occurrence of pulse 4, i.e. the first pulse of the second group associated with channel 1, it applies a pulse to its ouput 20 which enables gate 9 through input and nd consequently passes pulse 4 to circuit 28. Subsequently counter 18 supplies a pulse when pulse 7 occurs, when is therefore passed on to circuit 28, and so forth for pulses 10, 13 to 22 inclusive.

Figure 3:
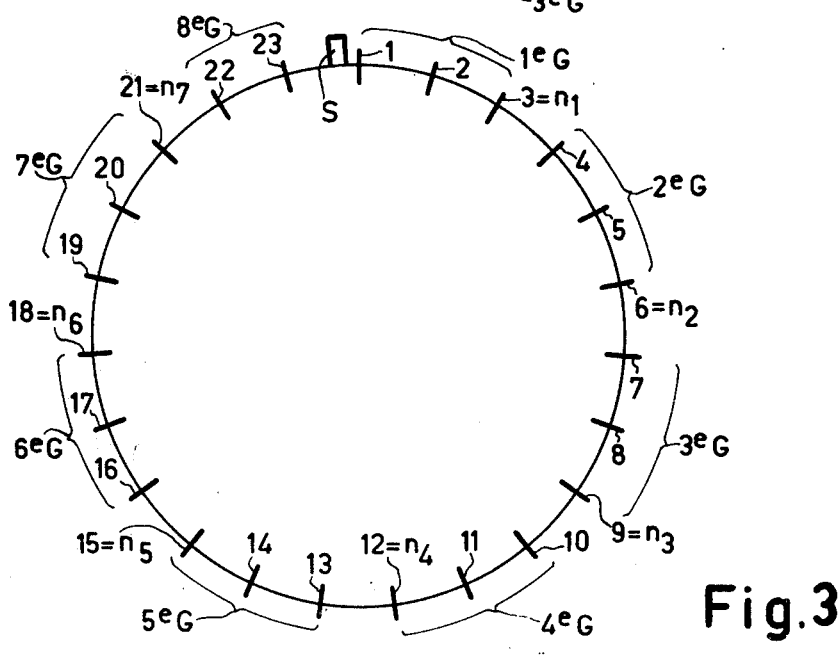
FIG. 3 is a simplified example of a pulse distribution into eight groups of three as may be effected along a single track.

FIG. 3 shows clearly that by omitting the third pulse from the 8th group (this would have been pulse 24) the pulse to be scanned after pulse 22 is pulse 2. As a result channel 1, being the sound information originating from the pulses 1, 4, 7, 10 . . . 22 changes uninterruptedly into channel 2 being the sound information originating from the pulses 2, 5, 8, 11 . . . 23 occurring at the second revolution of the record L with the same track being scanned.

Counting by the counter 18 may continue in a normal manner. In fact after pulse 22 the pulses 23, 1 and 2 appear (apart from pulse S which does not appear at the output 11 of the separator stage 8) so that upon the occurrence of pulse 2 counter 18 supplies a pulse which enables the gate 9 through input 21 and thus passes the pulse 2 occurring at input 22 on to circuit 28. The same is effected for the pulses 5, 8, 11 . . . 23. Subsequently channel 2 changes uninterruptedly, during the third revolution of record L with the same track being scanned, into channel 3, i.e. the pulse series 3, 6, 9 . . . 21.

During this third revolution pulse S is scanned for the third time so that counter 13 applies a pulse to its output 26 which pivots the mirror 2 through a control circuit 27 so that the beam of light 1 is directed onto the next track to be scanned. As already described in the foregoing it has been assumed that the pulse S from the previous track was the first pulse at the start of the track with reference to FIG. 3.

In the above-described operation of the playback unit the fact has not been taken into account that during each revolution of the record L the pulse S is passed and therefore appears at output 10 of the separator stage 8. This pulse can enable the gate 9 through the flipflop circuit 15 whenever a pulse 1 is scanned which is unwanted after the first revolution upon scanning of the same track has taken place. In addition the pulse S as applied to input 19 of the counter 18 may stop this counter which is likewise unwanted after the first revolution has taken place.

To ensure that after the first revolution has taken place and subsequently up to and including the $n^{th}$ revolution of the record L the connections between input 10 and inputs 14 and 19 are interrupted whenever the pulse S is passed after this first revolution, gates 30 and 31 are provided in said connections which gates are blocked by means of pulses derived from the counting circuit 32 during the occurrence of the pulses S after the first revolution has taken place. The counter 32 whose input 34 receives the pulses derived from output 11 must count $m \times n - 1$ pulses before applying a pulse to the flip-flop circuit 33 delaying this pulse in such a manner that the pulse provided by flip-flop 33 coincides with the occurrence of the pulse S after the first, second to $n^{th}$ revolution of the record L. In order to set the counter 32 at 0 at the start of the scanning of a track, a second input 35 thereof receives the pulses S derived from output 10.

There is still the difficulty that counter 32 must known when a new track is scanned, so that the gates 31 and 30 are then not blocked. Consequently a connection is established between a further output 36 of revolution counter 13 and a third input 37 of counter 32 through a flip-flop circuit 38. Pulses are then derived from output 36 which pulses appear after $(n - 1)$ pulses S have been applied to input 12. (It can also be said that division by $n - 1$ is effected between input 12 and output 36). Then $n - 1$ revolutions of the record L have taken place. The flip-flop 38 deforms the pulse of output 36 in such a manner that its duration becomes equal to one revolution of the record L. The pulse thus active at input 37 stops counter 32 during the $n^{th}$ revolution of the record L so that no blocking pulse is generated for the gates 30 and 31 and the pulse S occurring upon the first scanning of a new track can be active at the inputs 14 and 19.

It has been assumed in the foregoing that the pulses of each channel 1 to n inclusive have a certain modulation to comprise the sound information in that way. This may be a pulse duration modulation, pulse code modulation, inter alia delta modulation, or any other form of a time division multiplex code which is considered suitable. In the case of pulse duration modulation it is to be taken into account that the longest duration of the n pulses of ech of the m groups is shorter than the duration of the pulses S so as to ensure that the separator stage 8 can make a clear distinction between the two types of pulses.

It is to be noted that the processing circuit 28 includes a known decoder or demodulator circuit for decoding or demodulating the sound information recorded in pulse code modulation whereafter the sound signals thus obtained can be applied after amplification to the loud-speaker 29.

Figure 5:
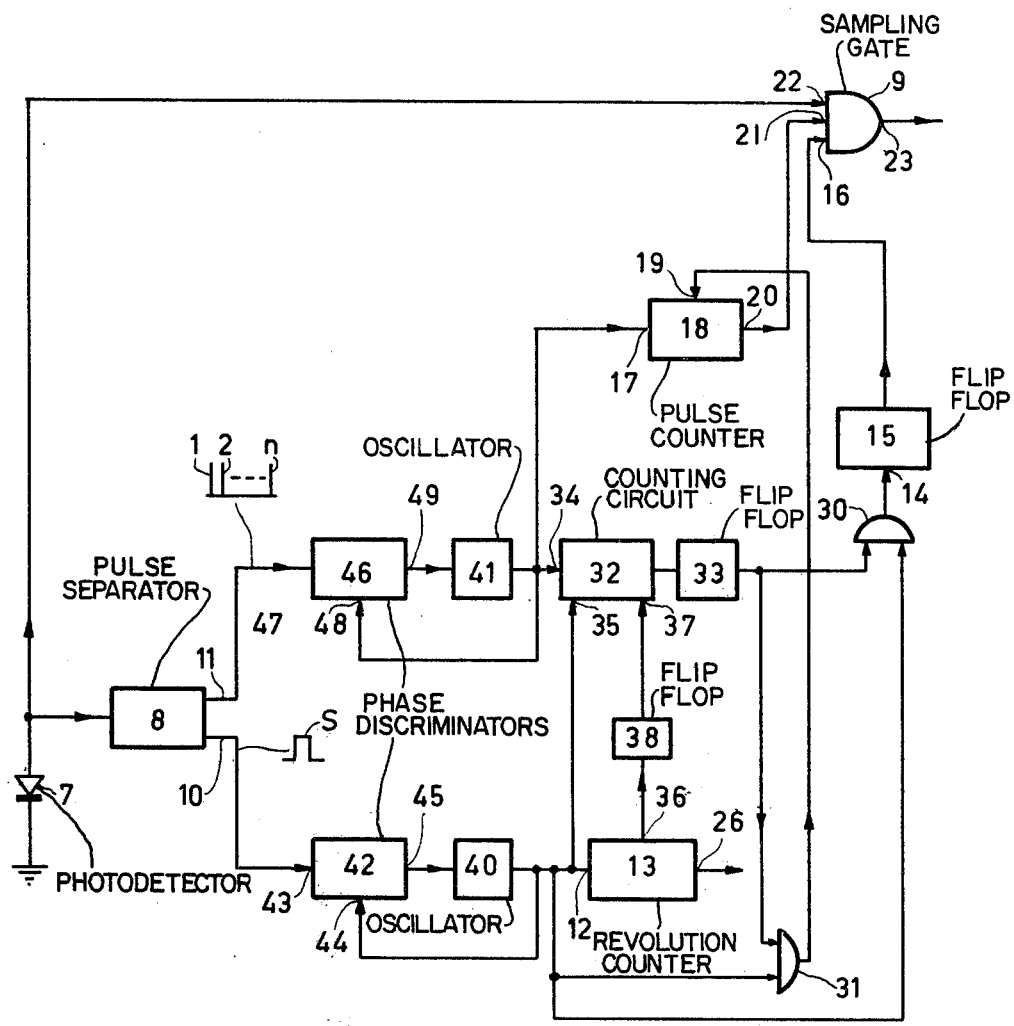
FIG. 5 is a further elaboration of the playback unit according to FIG. 4.

In the example according to FIG. 4 it has been assumed that both the pulses S and the n pulses ensure a so-called direct synchronization because they are directly applied to the dividers 13, 18 and 32. It is, however, alternatively possible, as shown in the example of FIG. 5 in which corresponding components have the same reference numerals as those in FIG. 4, to connect the outputs 10 and 11 to oscillators 40 and 41 synchronized by the pulses S and the n pulses, respectively. At a speed of 1500 r.p.m. of the record L 1 revolution takes 60/1500 seconds = 0.04 second = 1/25 second and the frequency of the pulses S thus is 25 Hz. Oscillator 40 must therefore oscillate at this frequency. Oscillator 40 may be directly synchronized with the pulses S from output 10, but it is alternatively possible, as is shown in FIG. 5, to do this by means of a phase discriminator 42. In the latter case the pulses S are applied to a first input 43 and the output pulses from oscillator 40 are applied to a second input 44 of the phase discriminator 42 so as to be compared therein so that a control voltage for oscillator 40 is applied to output 45 resulting in the oscillator being in step with the pulses S.

The output signal from oscillator 40 is applied to the inputs 12 and 35 of the dividers 13 and 32, respectively, and to the relevant inputs of the gating circuits 30 and 31. Thus, these are the same inputs as those to which in the embodiment of FIG. 4 the pulses S from output 10 are directly applied.

The same applies to oscillator 41. It oscillates at a frequency as dictated by the total number of pulses 1 to n provided in m groups, namely the number $m \times n - 1$ accommodated on one track multiplied by the speed of the record L. Oscillator 41 may alternatively be directly synchronized by these pulses, but here indirect synchronization is also possible by means of a second phase discriminator 46. In the latter case output 11 of stage 8 is connected to a first input 47 and the output signal from oscillator 41 is applied to a second input 48 of disciminator 46. As a result a control voltage for causing the oscillator 41 to operate in step with the pulses 1 to n is produced at output 49. The output signal from osciallator 41 is applied to the inputs 17 and 34 of the dividers 18 and 32, respectively, to which two inputs the n pulses from output 11 are directly applied to the embodiment of FIG. 4.

Particularly in the embodiment of FIG. 5 it is recommended to give no sound information on one or several tracks at the commencement of scanning record L but to use these tracks for causing the oscillators 40 and 41 to run in. It is then certain that when the sound information starts the entire playback unit is in synchronization so that a satisfactory sound reproduction is ensured.

To get an impression of the enormous playback duration which can be obtained with such a long-playing record it is assumed that pulse duration modulation is used, that the record L has a speed of approximately 1500 r.p.m. and that a sound signal having, for example, a maximum bandwidth of 16 kHz is to be recorded (high music quality). As is known the repetition frequency of the pulses which must transmit such a bandwidth must be twice the highest bandwidth. This means that this repetition frequency must be 32 kHz. The duration of a period thus is $1/32.10^3 \approx 34$ $\mu$s.

This means that the distance between two successive pulses must be such that at the given speed of the record L they are scanned 34 $\mu$s after each other by the beam of light 1.

The total bandwidth which can be achieved with the present-day long-playing records is approximately 5 kHz. At a pulse frequency of 32 kHz $(5.10^6/32.10^3) \approx$ 120 channels are therefore possible. Consequently the pulses of a single sound channel must be 34 $\mu$s apart and in between there must be 119 other pulses. In other words, the duration of a pulse may be $(34 \ \mu s/120 \approx$ 0.28 $\mu$s at a maximum.

To have the required margin a pulse duration of 0.1 $\mu$s is taken as a maximum for each of the n pulses comprising sound information and approximately 0.15 $\mu$s for the pulses S.

With $n = 120$ this means that n times the same track is to be scanned. Since one revolution takes 0.04 second, the playing duration of one track is $120 \times 1/25$ second = 4.8 seconds.

A record may comprise 40,000 to 60,000 tracks (this means that $r = 40,000$ or 60,000) which gives a playing duration of $40,000 \times 4.8$ seconds = 192,000 seconds which corresponds to over 50 hours, or $60,000 \times 4.8$ seconds = 264,000 seconds which corresponds to over 70 hours.

The above-mentioned periods of 50 of 70 hours of playing duration are such enormous periods that a better pulse code modulation, i.a. delta modulation instead of pulse duration modulation might just as well be used so that the duration of play is reduced, but is still long enough to record one or even more orchestra pieces or operas.

Figure 6:
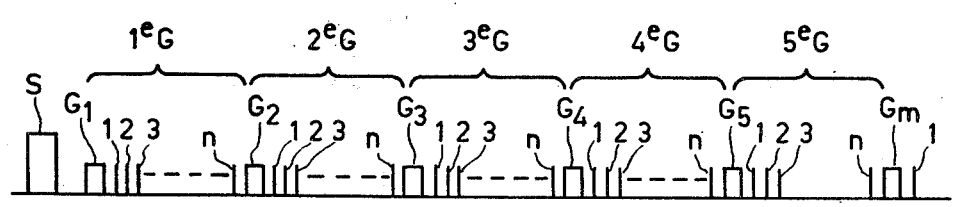
FIG. 6 shows an example of providing a track with extra group pulses intended for synchronization.

Since it is possible that the rotational speed of the record does not remain completely constant so that synchronization by n pulses alone of the m groups gives an insufficient certainty, extra group pulses G may be applied as is shown in FIG. 6. This may be realized on the record L itself by providing for each group of n grooves a further groove in each track whose length is shorter than the length of the groove provided at the start of each track but is longer than the maximum length of the grooves distributed in m groups.

In FIG. 6 in which part of a track is diagrammatically shown in a stretched form the so-called group pulses $G_1, G_2, G_3 \ldots G_m$ are shown which mark the start of a group of n pulses and which have a duration between that of the starting pulses S and the pulses 1 to n. A possible playback unit for the case where tracks according to FIG. 6 are provided on record L is shown in FIG. 7.

In FIG. 7 in which corresponding parts have the ame reference numerals as those in FIGS. 4 and 5 a third output 50 is connected to the separator stage 8, which output conveys the group pulses G. Separation in the stage 8 is possible again because the pulses S, G and 1 to $n$ each have a different duration.

Also an oscillator 51 is provided which oscillates at the frequency of the pulses G, being the frequency $m \times 25$ Hz when again 1500 r.p.m. is assumed for the record L and $m$ groups of pulses are provided per track. The oscillator 51 is synchronized by means of a third phase discriminator 52 to whose first input 53 the pulses G from output 50 are applied and which receives at its second input 54 the signals derived from the output of oscillator 51. The control signal then produced at output 55 causes oscillator 51 to operate in step. The output of oscillator 51 is applied to a third input 56 of the divider stage 18 which in fact differs in construction from the embodiment of FIGS. 4 and 5. In fact the object of the signal at input 56 is to set the counter 18 to zero when each pulse G occurs so that this counter every time starts to count from the beginning. When at the first revolution of record L upon tracking of a new track channel 1 must be passed on, a pulse must be applied to input 21 of gate 9. In fact a pulse must immediately appear at output 20 of counter 18 after pulse G has reset this counter to 0.

By means of a pulse derived from revolution counter 13 and applied to a fourth input 57 of counter 18, this counter is adjusted at the commencement of tracking a new track (in fact counter 13 provides a pulse at the end of the $n^{th}$ revolution of the previous track) in such a manner that all division counting circuits within counter 18 are blocked. At the first revolution of a new track the new pulses are therefore directly passed on from input 17 to output 20. The input 16 of gate 9 may therefore be omitted in the embodiment according to FIG. 7.

After the first revolution the pulse S from oscillator 40 appears at input 19 which pulse switches on a first division counting circuit of counter 18 so that counter 18 then divides by two. Every time after a pulse G has set counter 18 to 0 the second pulse of the $n$ pulses is passed on to output 20 so that channel 2 is utilized.

After the second revolution pulse S at input 19 causes counter 18 to divide by three so that channel 3 is then utilized. This continues until at the $n - 1^{th}$ revolution the counting circuit 18 divides by $n$ and channel $n$ is utilized.

After the $n^{th}$ revolution the next track is used and a pulse at input 57 sets counter 18 to the required starting position.

As can be seen it is not necessary in the embodiment according to FIGS. 6 and 7 to omit the last pulse of the $m^{th}$ group because each channel is separately switched on by the control of the counter 18.

A drawback of the system according to FIGS. 6 and 7 may be the extra space being lost by providing the pulses G. The result is that every time short interruptions (gaps as it were) occur in the sound reproduction which are felt as an interfering sound. This is particularly the case when after one revolution a starting pulse S and the first group pulse $G_1$ occur shortly after each other. This drawback can, however, be obviated when a charge transfer device (CTD) in the form of a bucket brigade devie (BBD) or charge coupled deivce (CCD) is provided between the output 23 and the processing circuit 28.

In the example of FIG. 7 two CTD's 60 and 61 are provided. Their input terminals 62 and 63 are connected to the two output contacts of switch 64 whose master contact is connected to output 23 of gate 9. Furthermore the CTD's 60 and 61 are provided with control terminals 65 and 66 each being connected to two of the four output contacts of switch 67. One input contact 68 of switch 67 is connected to output 20 of counter 18 and the other input contact 69 is connected to oscillator 51. The output terminals 70 and 71 of the CTD's 60 and 61 are connected to the two input contact of switch 72 whose master contact is connected to amplifier 28.

The switches 64, 67 and 72 are only diagrammatically shown in FIG. 7 but may be formed in known manner with diodes. These switches are controlled from a flip-flop circuit 73 receiving pulses derived from oscillator 40. The flip-flop circuit 73 makes a square-wave signal from S pulses having half the frequency of the S pulses, namely a positive polarity during the first-half of its period and a negative polarity during the second half. One periode half exactly corresponds to one revolution of the record L.

Consequently, in the switches 64, 67 and 72 one half of the diodes present therein is conducting during the said first half so that, for example, the connections shown in FIG. 7 are established and the other half of the diodes is conducting during the said second half so that the connections not shown are then established.

In the position shown the sound signal is written into the CTD 60 to which end the pulses active at input 21 also reach the control terminal 65 of CTD 60 through the input terminal 68 of switch 67. At the same time CTD 61 in which the sound signal of the previous channel was written in during a previous revolution is read out. To this end the pulses G dervied from oscillator 51 and occurring, as shown in FIG. 6, at regular instants are applied through input contact 69 of switch 67 to control terminal 66. After a revolution of record L has elapsed, the switches 64, 67 and 72 change over so that now CTD 60 is read out and CTD 61 is written in etc.

As described in the foregoing the duration of play of the record L for audio reproduction is very long. This record is therefore very suitable for recording stereophonic or quadraphonic signals.

In the embodiment according to FIG. 8 an application for stereophony is described in which every time to channels are directly read out after each other.

To achieve this the playback unit also includes:
2 pulse counters 18 namely pulse counters 181 and 182,
2 sampling gates 9 namely gates 91 and 92,
2 processing circuits 28 namely circuis 281 and 282 to which loudspeakers 291 and 292 are connected.

In addition in a long-playing record intended for stereophonic sound reproduction the grooves of each of the $m$ groups occurring in an odd sequence (1, 3, 5, ...) must comprise information of one stereophonic signal whereas the grooves of each of the $m$ groups occurring in an even sequence (2, 4, 6 ...) must comprise information of the other stereophonic signal.

The playback unit according to FIG. 8 must be proportioned in such a manner that gate 91 only pases the odd channels (that is to say, the channels 1, 3, 5 ...) and gate 92 only passes the even channels (that is to say, the channels 2, 4, 6 ...). When it is ensured that during recording the odd channels get information, for example, for the loudspeaker 291 on the left-hand side (the so-called left-hand or L signal) and the even channels get the information for the loudspeaker 292 on the right-hand side (the so-called right-hand or R signal) stereophonic sound can be reproduced with these two loudspeakers.

To achieve this the counter 181 must count the odd pulses, 1, 3, 5 . . . and the counter 182 must count the even pulses 2, 4, 6, . . . This is possible because the pulses S appearing at input 191 cause division counters of counter 181 to be switched on so that after resetting by the pulses G at input 561 counting to one is effected at the first revolution, to three at the second revolution, to five at the third revolution etc.

In a corresponding manner the pulses S appearing at input 192 must every time cause division counters of counter 182 to be switched on in such a manner that after resetting by the pulses G at input 562 counting to two is effected at the first revolution, to four at the second revolution, to six at the third revolution etc.

Since there is a given time difference between the occurrence of the even and off channels, a delay line 80 is arranged between the output 231 and processing circuit 281, which delay line has a delay time equal to the difference in time between the occurrence of the pulses 1 and 2, 3 and 4, 5 and 6 etc. Since these pairs of pulses are provided on the record shortly after each other a delay time of approximately 0.1 to 0.2 $\mu$sec for the delay line 80 is sufficient.

It will be evident that when quadraphonic reproduction is to be realized in a corresponding manner everything must be fourfold i.e., four pulse counters 18, four sampling gates 9, four processing circuits 28 and four loudspeakers 29 connected thereto. The control must be such that every time one of the four gates passes on one of the four channels and three delay lines are provided to eliminate the time difference between the four successively occurring pulses. Also on a record L intended for quadraphonic reproduction the grooves of each of the $m$ groups occurring in the 1st, 5th, 9th etc. sequence must comprise information for the first quadraphonic signal and the grooves of each of the $m$ groups occurring in the 2nd, 6th, 10th etc. sequence must comprise information for the second quadraphonic signal, the grooves occurring in the 3rd, 7th, 11th position must comprise information for the third quadraphonic signal and the grooves occurring in the 4th, 8th, 12th etc. position must comprise information for the fourth quadraphonic signal.

This method also provides the possibility of reproducing $k$ different instruments each through a separate loudspeaker. For this purpose the components 18, 9, 28 and 29 must be multiplied by a factor of $k$ and the successive grooves on the record must be provided with information during recording in such a manner that each of the $k$ channels comprises sound from another instrument. This makes it possible to reproduce a given orchestra piece with a very high fidelity and optionally to temporarily switch off one or more gates 9 so as to judge the effect when one or more instruments so not participate. This shows the special advantage of the synchronizing method according to the present invention, namely the very easy possibility of realizing stereophonic, quadraphonic or $k$-phonic reproduction because the counting circuits can every time select the relevant channel which is to be applied to the relevant processing circuit with the associated loudspeaker.

Furthermore it will be evident that when too large gaps occur in the sound due to the pulses S and G, CTD's can be arranged between the sampling gates 9 and the $k$-processing circuits 28 in the playback unit according to FIG. 8 and in a corresponding manner for playback units intended for $k$-fold reproduction, as has been described for single-fold reproduction with reference to FIG. 7.

Finally it is to be noted that when given effects such as dynamic compression are to be incorporated, information for controlling the relevant circuits which must realize such compression and decompression effects can be laid down in a separate channel. In that case so-called compression or decompression pulses DC will be applied to each group of pulses 1 to $n$ in addition to the group pulses G, which compression or decompression pulses may be provided as decompression and compression grooves $DC_1$, $DC_2$ . . . $DC_m$ on the record right after the group grooves $G_1$, $G_2$ . . . $G_m$.

The foregoing description has been substantially based on a record L on which the tracks are provided as concentrical circles as shown in FIG. 1. In fact change-over of the light beam front one to the other track brought about by pivoting the mirror 2 is then only to be effected once after $n$ revolutions of the record L. Since the total time for $n$ revolutions amounts to several seconds and the change-over time from one to the other track is several tens of microseconds, for example, 50 $\mu$s this change-over time is negligible with respect to the time of $n$ revolutions.

It is, however, different when a spiral-shaped track is scanned as is shown in FIG. 2. In that case a return (except after the $n^{th}$ revolution) to the start of the same track is to be effected after each revolution of 1/25 sec. This means that when, for example, the 2nd track is scanned a return is to be effected after passing of the starting pulse $S_3$ to the position of the track marked by the starting pulse $S_2$. It will be evident that in that case a CTD is strictly necessary which writes with the speed at which the pulses from the record L are presented and then reads out, by means of time decompression, the pulses having a reduced but regular speed so that the gaps in the sound drop out.

Such an embodiment of a playback unit for playing a record L having a spiral-shaped track as shown in FIG. 2 can be realized with a playback unit according to FIG. 7 if an extra connection is established therein between the output of oscillator 40 and control circuit 27. This is shown by the broken line 81 in FIG. 7. These pulses which are applied through lead 81 to circuit 27 must control this circuit in such a manner that the mirror pivots back so that the beam of light 1 after passing the said pulse $S_3$ returns to the place marked by the pulse $S_2$. After $n$ revolutions the pulse from output 26 to revolution counter 13 must prevent the pulse S applied through lead 81 from being active so that in that case mirror 2 is not pivoted and scanning of the next track can commence.

Particularly for scanning a spiral-shaped track a change-over time of the beam of light of 50 $\mu$ sec is long because this is more than the duration of the period of 34 $\mu$s calculated therefor at a pulse frequency of 32 kHz.

Figure 9:
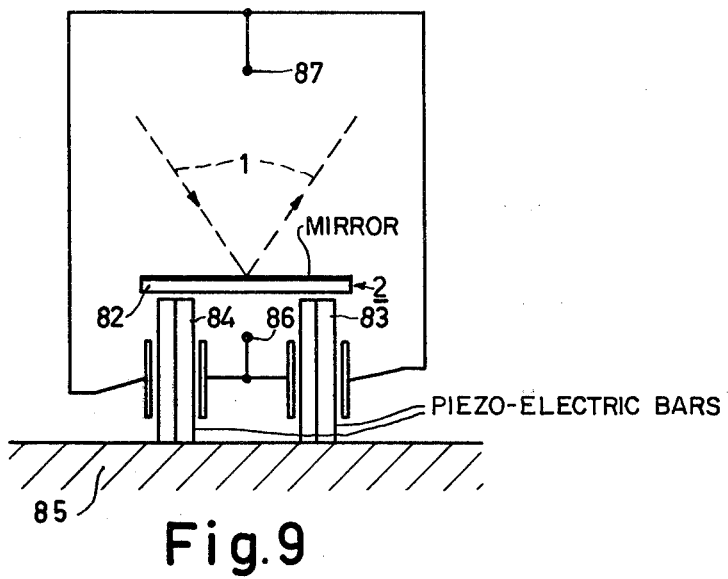
FIG. 9 shows a possible embodiment of a pivoting mirror as used in a playback unit and FIG. 10 shows a signal necessary for causing the mirror according to FIG. 9 to pivot.

For this reason FIG. 9 shows a possible construction of the mirror 2 which makes a change-over time possible which is shorter than 50 $\mu$s, for example, a change-over time in the order of 30 $\mu$s thus being below the duration of the period of 34 $\mu$s.

The mirror 2 in FIG. 9 consists of a bar 82 which is as thin as possible and is silver-plated for reflecting the light beam 1. This bar 82 is clamped on one side (not shown in FIG. 4) and is supported on the opposite side by the bars 83 and 84 which are fixed on a support 85.

The bars 83 and 84 are made of piezo-electric material, for example, the material of the Philips code number PXE 10 type, preferably laminated and provided with electrodes. These electrodes are connected to the terminals 86 and 87 which are connected to the control circuit 27.

Such a control circuit may consist of, for example, a charge resistor and a short-circuit transistor so that the capacitor constituted by the electrode provided on the supporting bars 83 and 84 and having a dielectric constant determined by the piezo-electric material is alternately charged and discharged. Charging is effected during the time $T_2$ ($T_2$ is 0.04 sec.$-T_1$) see FIG. 10, which substantially corresponds to the time of one revolution of the record L. Discharging is effected in that the transistor is bottomed by pulses S supplied through the lead 81 during the time $T_1(T_1 = 30$ $\mu$s). During the flyback time $T_1$ mirror 2 is thus rapidly pivoted back so that the light beam 1 is returned to a place marked by pulse $S_2$ and the mirror slowly pivots during the time $T_2$ in order to cause the light beam 1 to follow the spiral-shaped track from $S_2$ to $S_3$ (and corresponding tracks).

Figure 10:
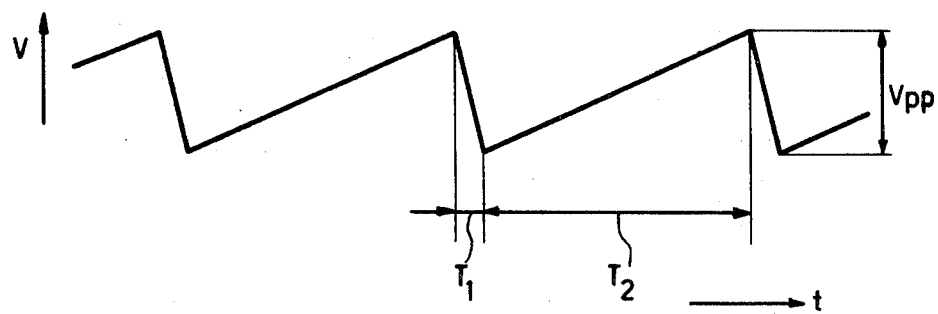

The number of periods of the sawtooth oscillation shown in FIG. 10 is $n$ corresponding to the $n$ channels which must be derived from the same track during $n$ revolutions of the record L. After $n$ revolutions the pulse from output 26 eliminates the pulse from lead 81 so that the short-circuit transistor is not rendered conducting. Mirror 2 is not pivoted back and simultaneously the control mechanism built in circuit 27 is activated which ensures that at the first revolution of the record L when the third track (located between the pulses $S_3$ and $S_4$) is scanned for the first time the light beam 1 is maintained focussed on this third track while the carriage on which the optical system is mounted is moved to bring it to its new position within 0.04 sec (one revolution). Subsequently the sawtooth voltages pivoting the mirror 2 to and fro start again.

It is to be noted that the peak-to-peak voltage $V_{pp}$ of the sawtooth voltage must be sufficiently high to overcome the total mass inertial effect of the mirror 2 so as to cause it to pivot back during a time $I_1 = 30$ $\mu$s.

What is claimed is:

1. A playback unit for an associated long-playing record on which sound information is recorded in $r$ information track segments provided as substantially concentric circles or provided as a spiral on the record in the form of sound signal pulses in time division multiplex code, and a starting pulse at the beginning of each track segments, said recorded sound signal pulses being distributed in $m$ groups of $n$ ordered recorded sound signal pulses per group in each track segment, said unit comprising follower means for causing a pick-up device to follow an information track, a detector detecting pulses derived through the pick-up device from the record, said pulses comprising the sound information in said time division multiplex code and said starting pulses, separating means for separating said sound signal pulses read from said record from said starting pulses, a sound reproducing device, sampling gate means responsive to sampling signals for passing said sound signal pulses to said sound reproducing device, a first synchronization means responsive to said sound signal pulses from said separating means for periodically providing said sampling gate means with a plurality of series of first sampling signals in response to each $n$ sound signal pulses, second synchronization means connected to said first synchronization means and responsive to said starting pulses from said separating means for initiating each of said plurality of series of first sampling signals at instants corresponding sequentially to the ordered sound signal pulses of said first group of sound signal pulses in each track segment, and for causing said follower means to force said pick-up means to scan a next subsequent track to be scanned after $n$ revolutions of the record during which the same track segment has been scanned.

2. A unit as claimed in claim 1, wherein the second synchronizing means includes a revolution counter to which the starting pulses are applied, which revolution counter provides a pulse every time after $n$ starting pulses are applied to its input, which pulse directs the pick-up device to a subsequent track through a control circuit.

3. A unit as claimed in claim 1, in which additional pulses hereinafter termed group pulses are provided on each of the $r$ tracks every time before the commencement of a group of the $m$ pulses of $n$ sound signal pulses and wherein said unit further comprises a third synchronizing means which responds to group pulses obtained during playback from said recorded group pulses, the first synchronizing means being further controlled by said third synchronizing means.

4. A unit as claimed in claim 3, whereby the first synchronizing means includes a pulse counter provided with division counters to a first input of which $m$ groups of $n$ pulses are applied per revolution of record L and in which group pulses are applied to a second input of said pulse counter from the third synchronizing means, said group pulses setting the pulse counter to zero at their occurence, while starting pulses are applied to a third input of said pulse counter from the second synchronizing means, which starting pulses switch on a new division counter after the revolution of the record L so that as a function of revolution effected per track a pulse counter counts 1, 2 . . . $n$, said pulse counter having a fourth input to which pulses derived from the revolution counter are applied which set all division counters to the initial position again after $n$ revolutions of the record.

5. A unit as claimed in claim 4, whereby the playback unit comprises two storage elements in which an audio channel can be alternately written in and read out.

6. A unit as claimed in claim 5, whereby each storage element comprises control terminals to which the output pulses from the pulse counter are applied when the audio channels are written in and to which the group pulses derived from the third synchronizing means are applied when said channels are read out.

7. A unit as claimed in claim 6, for $k$ phonic sound reproduction comprising a playback unit with $k$ processing circuits with associated loudspeakers and that switching means are present which alternately apply an audio channel to one of the $k$ processing circuits.

8. A unit as claimed in claim 7, whereby the switching means comprise $k$ pulse counters and $k$ sampling gates, each pulse counter controlling an associated sampling gate in such a manner that each pulsecounter only applies pulses to the associated sampling gate when one of the $k$ audio channels must be passed.

9. A unit claimed claimd in claim 1, whereby the first synchronizing means includes a pulse counter to a first input of which $m$ groups of $n$ pulses are applied per revolution of record said counter providing a pulse every time after $n$ pulses are applied to said input, said pulse enabling said sampling gate means so that this gate passes on one pulse of each group corresponding to the same order, said pulses of a given order constituting an audio channel, while starting pulses are applied through the second synchronizing means to a second input of said pulse counter which after each revolution shifts the counting of the pulses over one such pulse so that the sampling gate means every time passes on a pulse of each group from a subsequent order.

* * * * *

UNITED STATES PATENT AND TRADEMARK OFFICE
CERTIFICATE OF CORRECTION

PATENT NO. : 4,022,986
DATED : May 10, 1977
INVENTOR(S) : KEES TEER ET AL

It is certified that error appears in the above-identified patent and that said Letters Patent are hereby corrected as shown below:

Col. 2, line 2, cancel the commas both occurences;

line 4, "m" second occurence should be --n--;

line 34, "same" should be --said--;

line 55, "shaft" should be --shift--;

Col. 3, line 3, "referenc" should be --reference--;

line 4, "accompanying accompaying" should be --the accompanying--;

Col. 4, line 53, after "output" should be --10--;

Col. 5, line 62, "and nd" should be --21 and--;

Col. 6, line 57, "known" should be --know--;

Col. 8, line 30, after "120" should be --)--;

Col. 9, line 3, "ame" should be --same--;

Col. 10, line 65, "pases" should be --passes--;

Col. 11, line 1, after "get" should be --the--;

UNITED STATES PATENT AND TRADEMARK OFFICE
CERTIFICATE OF CORRECTION

PATENT NO. : 4,022,986

DATED : May 10, 1977

INVENTOR(S) : KEES TEER ET AL

It is certified that error appears in the above-identified patent and that said Letters Patent are hereby corrected as shown below:

Col. 11, line 61, "so" should be --do--;

Col. 12, line 10, after "compression" should be --and decompression--;

Col. 13, line 48, "$I_1$" should be --T1--.

Signed and Sealed this second Day of August 1977

[SEAL]

Attest:

RUTH C. MASON
*Attesting Officer*

C. MARSHALL DANN
*Commissioner of Patents and Trademarks*